UNITED STATES PATENT OFFICE.

WILLIAM ADAMSON AND CHARLES F. A. SIMONIN, OF PHILADELPHIA, PENNSYLVANIA, ASSIGNORS TO WILLIAM ADAMSON.

IMPROVEMENT IN TREATING FLESH, OFFAL, &c.

Specification forming part of Letters Patent No. 119,000, dated September 19, 1871.

*To all whom it may concern:*

Be it known that we, WILLIAM ADAMSON and CHARLES F. A. SIMONIN, both of Philadelphia, county of Philadelphia, State of Pennsylvania, have invented an Improvement in Treating Flesh, Entrails, and Offal for Preservation, Manure, &c., of which the following is a specification:

Our invention consists in treating animal and fecal substances, garbage, &c., with hydrocarbon, substantially as described hereafter, so as to deprive them of the ingredients which induce putrescence and obtain valuable products.

Oils and fats have been extracted from animal matter by the direct application of liquid hydrocarbons, but this necessarily involves a considerable waste of the fluid, which is retained in the residuum after the fat has been extracted.

Fertilizers have been prepared from offal and fish by passing air or gas, or gas charged with hydrocarbon and phenol vapors, through the mass, and subsequently drying with hot air, no pressure being used. This differs from our invention, as the vapor we employ is unmixed with air or gas, is solely the product of the distillation of hydrocarbons, and is used under pressure.

Hydrocarbon vapors have also been employed to extract animal fats, as in the Patent No. 75,980, granted March 24, 1868, to Louis S. Robbins, but although the vapor acts as an effective solvent, we have found by repeated experiments that hydrocarbon vapor under heat and pressure acts much more effectively in extracting fats and oils from animal matter than liquid hydrocarbon alone, or hydrocarbon vapor without pressure; hence our present invention is restricted to the employment of hydrocarbon vapors under heat and pressure.

Although different modes of carrying our invention into effect may be adopted, we prefer the following: The animal matter is placed on a perforated diaphragm in a closed vessel, furnished with a suitable safety-valve, and beneath the diaphragm is introduced a supply of hydrocarbon, by preference such as is of a volatile character—benzine, benzole, gasoline, or naphtha, for instance—and this is vaporized by means of a steam-coil or otherwise. The vapor rises, and after permeating the mass of offal passes off from the vessel to a condenser, from whence it is returned in its original condition of a volatile liquid hydrocarbon to the space in the vessel below the diaphragm, to be again vaporized; or the hydrocarbon may be permitted to pass into the vessel near the top, and through the animal matter, until it reaches a point where it is again vaporized. The process is conducted under more or less pressure, determined by a weighted valve in the pipe through which the vapor passes to the condenser; the greater the pressure the more rapid and thorough will be the extraction of the fat.

The extract, consisting of liquid hydrocarbon holding fatty and oily matter in solution, may be removed from time to time from the vessel through a suitable discharge-cock, and may be redistilled, in order to separate the fats from hydrocarbons; and this redistillation may, if desired, be conducted in the same vessel in which the extract is obtained.

For the reason above given, we do not claim, broadly, extracting animal fats by liquid hydrocarbons or by hydrocarbon vapors; but

We claim—

The extraction of animal oils and fats by hydrocarbon vapors, under heat and pressure, substantially in the manner described.

In testimony whereof we have signed our names to this specification in the presence of two subscribing witnesses.

WM. ADAMSON.
CH. F. A. SIMONIN.

Witnesses:
WM. A. STEEL,
HARRY SMITH.